(12) United States Patent
Buller (10) Patent No.: US 11,241,631 B1
(45) Date of Patent: Feb. 8, 2022

(54) GAME CONTROLLER STAND (71) Applicant: Marketing Instincts Inc., Temecula, CA (US)

(72) Inventor: Jonathan Blake Buller, Temecula, CA (US)

(*) Notice: Subject to any disclaimer, the term of this patent is extended or adjusted under 35 U.S.C. 154(b) by 0 days.

(21) Appl. No.: 17/036,262

(22) Filed: Sep. 29, 2020

Related U.S. Application Data (63) Continuation-in-part of application No. 29/741,635, filed on Jul. 14, 2020.

(51) Int. Cl.
*A63F 13/98* (2014.01)
*A63F 13/24* (2014.01)

(52) U.S. Cl.
CPC ............. *A63F 13/98* (2014.09); *A63F 13/24* (2014.09)

(58) Field of Classification Search
None
See application file for complete search history.

(56) References Cited

U.S. PATENT DOCUMENTS

| | | |
|---|---|---|
| D252,899 S | 8/1979 | Campbell |
| D273,165 S | 3/1984 | Sternberg |
| D278,102 S | 3/1985 | Wagner, Jr. |
| D281,657 S | 12/1985 | Roczey |
| D287,365 S | 12/1986 | Judd |
| D316,347 S | 4/1991 | Getto |
| D320,027 S | 8/1991 | Mintz et al. |
| D330,147 S | 10/1992 | Garber |
| D332,360 S | 1/1993 | Golds |
| D337,762 S | 7/1993 | Crane |
| D338,453 S | 8/1993 | Martin |
| D351,147 S | 10/1994 | Hill |
| D361,452 S | 8/1995 | Neylon |
| D363,619 S | 10/1995 | Kamaze |
| D368,605 S | 4/1996 | Lechleiter |
| D371,220 S | 6/1996 | Behrens |
| D391,098 S | 2/1998 | Northrop |
| D411,824 S | 7/1999 | Wilson, Sr. et al. |
| D435,253 S | 12/2000 | Oden, II et al. |
| 6,480,398 B1 * | 11/2002 | Fiora ................. G06F 1/181 |
| | | 174/382 |
| D468,305 S | 1/2003 | Ma et al. |
| D469,073 S | 1/2003 | Muenscher et al. |
| D489,412 S | 4/2004 | Hsu |
| D501,191 S | 1/2005 | Siebke |
| D501,617 S | 2/2005 | Katz |
| D502,913 S | 3/2005 | Fukami et al. |

(Continued)

*Primary Examiner* — Tramar Harper
(74) *Attorney, Agent, or Firm* — Kirk A. Buhler; Buhler & Associates Patenting (57) ABSTRACT

Improvements in a holder for a game controller that allows a game controller to sit in a vertical on a stand or holder. The storage in a vertical orientation reduces the footprint of the controller on a desk or shelf. This also allows for better visual appearance of the controller as it sits on a desk. The holder further places the controller in a position where it can be more quickly retrieved for use. A power storage that powers the controller to extend operating time of the controller. The face plate can include indicia that match a gaming system or a game and the face plate can be removed or replaces. A charge indicator extends through the face plate. The controller can be used in the holder without restrictions of use.

17 Claims, 6 Drawing Sheets

(56) References Cited

U.S. PATENT DOCUMENTS

| | | | |
|---|---|---|---|
| 6,932,341 B1* | 8/2005 | Kenyon | A63F 13/02 |
| | | | 273/148 B |
| D510,208 S | 10/2005 | Klimas | |
| D523,809 S | 6/2006 | Roth et al. | |
| D529,440 S | 10/2006 | Lodato et al. | |
| D532,746 S | 11/2006 | Meyers et al. | |
| D540,802 S | 4/2007 | Hussaini et al. | |
| D545,319 S | 6/2007 | Griffin | |
| D549,707 S | 8/2007 | Depay | |
| D568,809 S | 5/2008 | Izumo | |
| D574,375 S | 8/2008 | Prest et al. | |
| 7,625,286 B2 | 12/2009 | Hamada | |
| 7,697,963 B1 | 4/2010 | Pomery | |
| D615,491 S | 5/2010 | Emminger | |
| 7,772,802 B2 | 8/2010 | Manico et al. | |
| D626,558 S | 11/2010 | Julien | |
| D634,708 S | 3/2011 | Cowan et al. | |
| D636,395 S | 4/2011 | Anderson et al. | |
| 7,942,747 B2 | 4/2011 | Cole | |
| D647,525 S | 10/2011 | Seto | |
| D647,881 S | 11/2011 | Warner | |
| 8,054,295 B2 | 11/2011 | Henty | |
| D652,795 S | 1/2012 | Attanasio | |
| D666,025 S | 8/2012 | Cobbett et al. | |
| D674,381 S | 1/2013 | Ma | |
| D675,323 S | 1/2013 | Spainhower | |
| D685,366 S | 7/2013 | Ding | |
| 8,926,414 B1* | 1/2015 | Kirkpatrick | G06F 1/20 |
| | | | 454/184 |
| 9,421,472 B2 | 8/2016 | Buller | |
| 2002/0132651 A1 | 9/2002 | Jinnouchi | |
| 2005/0255916 A1* | 11/2005 | Chen | A63F 13/98 |
| | | | 463/37 |
| 2006/0148578 A1* | 7/2006 | Hayes | G11B 33/025 |
| | | | 463/47 |
| 2006/0258464 A1* | 11/2006 | Kawanobe | A63F 13/08 |
| | | | 463/46 |
| 2007/0124778 A1 | 5/2007 | Bennett et al. | |
| 2007/0207862 A1 | 9/2007 | Calhoun | |
| 2008/0093208 A1* | 4/2008 | Seo | H04M 1/026 |
| | | | 200/406 |
| 2008/0150480 A1* | 6/2008 | Navid | H02J 7/0027 |
| | | | 320/113 |
| 2008/0153594 A1 | 6/2008 | Zheng | |
| 2009/0072784 A1 | 3/2009 | Erickson | |
| 2009/0154095 A1* | 6/2009 | Woud | H02J 7/0042 |
| | | | 361/679.56 |
| 2009/0213081 A1 | 8/2009 | Case, Jr. | |
| 2009/0325717 A1* | 12/2009 | Lee-Him | A63F 13/98 |
| | | | 463/47 |
| 2010/0234099 A1 | 9/2010 | Rasmussen et al. | |
| 2010/0298053 A1 | 11/2010 | Kotkin | |
| 2011/0118032 A1* | 5/2011 | Zalewski | A63F 13/428 |
| | | | 463/39 |
| 2012/0273643 A1* | 11/2012 | Chang | H01R 13/745 |
| | | | 248/346.06 |
| 2013/0023312 A1* | 1/2013 | Staebler | H04M 1/04 |
| | | | 455/575.1 |
| 2013/0221923 A1* | 8/2013 | Robertson | H02J 7/0045 |
| | | | 320/112 |
| 2014/0208194 A1* | 7/2014 | O'Leary | G06F 40/174 |
| | | | 715/222 |
| 2014/0274208 A1* | 9/2014 | Baschnagel | H04M 1/04 |
| | | | 455/557 |
| 2015/0190720 A1* | 7/2015 | Buller | A63F 13/98 |
| | | | 463/47 |
| 2016/0141901 A1* | 5/2016 | Navid | H02J 7/025 |
| | | | 320/108 |
| 2018/0076648 A1* | 3/2018 | Kumar | H02J 7/025 |

\* cited by examiner

GAME CONTROLLER STAND

CROSS REFERENCE TO RELATED APPLICATIONS

This application claims the benefit of Design application Ser. No. 29/741,635 filed Jul. 14, 2020 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a remote control stand. The stand has the ability to charge a gaming controller and has a changeable front face that allows a single controller stand to be used with different controller systems and different games.

Description of Related Art Including Information Disclosed Under 37 CFR 1.97 and 1.98

For people who play video games, the video game typically is played with a user holding a game controller with one or more hands. When a person is not playing the person typically place the controller on a shelf. The shape of a hand controller is typically an elongated rectangular, and when the controller is placed on a shelf the shape of the controller occupies a large footprint on the shelf. Placing the controller in a vertical orientation occupies less shelf place.

Modern wireless game controller also operates with batteries that require recharging or replacement. Batteries are typically charged or held in a separate location. When replaceable batteries are used the batteries are stored away from the controller where the replacement batteries are not easily accessed. Another problem when a remote is being used is when a person sets the remote onto a surface or lift the remote from a table the buttons can be pressed that changes what is being viewed can change.

A number of patents and or publications have been made to address these issues. Exemplary examples of patents and or publication that try to address this/these problem(s) are identified and discussed below.

U.S. Pat. No. D363,619 issued on Oct. 31, 1995 to Christopher Karnaze discloses a Remote Control Holder for Electronic Equipment. This patent is for remote controllers for a TV, stereo, cable box, DVD player or the like. The holder has a flat portion with lips that prevents the remotes from sliding off the front or sides of the holder. While this device holds one or more remotes it is not configured for a video game controller and further does not include a compartment for spare batteries.

U.S. Pat. No. D501,617 issued on Feb. 8, 2005 to Denis Katz discloses a Remote Control Caddy for holding remote controls for audio/video equipment or remote controls. While a user could place a game controller into the holder the holder is not configured to retain video game controllers and does not have a foldable stand that is found in this disclosure.

U.S. Pat. No. 7,942,747 issued on May 17, 2011 to Randall C. Cole discloses a Video Game Controller Rack. The rack provides a safe convenient and practical way of storing game controllers when the game controller is not in use by a gamer. The rack provides for multiple game controllers to be stored in vertical holders. While the rack stores controllers the rack is a static device with fixed elements and does not provide for storage of batteries or adjustability.

What is needed is a remote control stand that is configured to hold and charge a game controller. The remote control stand has a changeable face plate that can be changed to match a particular game or game system. The remote control stand in this disclosure provides the solution.

BRIEF SUMMARY OF THE INVENTION

It is an object of the remote control stand to allow the game controller to sit in a vertical on a stand or holder. Storing the controller in a vertical orientation reduces the footprint of the controller on a desk or shelf. This also allows for better visual appearance of the controller as it sits on a desk. The holder further places the controller in a position where it can be more quickly retrieved for use. The holder also allows for a neater appearance of the controllers as opposed to the controller being randomly placed within or on a shelf or desk.

It is an object of the remote control stand to have a changeable or interchangeable face plate. The face plate can be printed, molded or configured to match a particular game or gaming hardware.

It is an object of the remote control stand to include skin coverings that can be used to provide a custom appearance of the game holder. The skins can be specific for the gaming system or can be included with a particular game to provide an appearance that covers one or multiple surfaces of the holder.

It is an object of the remote control stand to provide an enlarged grip area for the remote control that allows a user to safely hold the game controller without fear of activating the buttons and controls as the person lifts the holder and game controller and sets the holder and game controller down as a single unit.

It is another object of the remote control stand for the buttons of the controller to still be available while the game controller is in the holder. This allows a user to activate all of the remote functions while the game controller is retained in the holder without restricting or limiting the controls.

It is another object of the remote control stand to have charging pads that charge a game controller while the game controller is installed on the stand. This allows the game controller to be used while being charged. The charging system can charge the remote control at a faster rate than power is consumed by the remote control.

It is still another object of the remote control stand to have a charge indicator that has at least one color and/or flashed to indicate the charging status of the remote. The charge indicator can show more than one status like charging and charged.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Figure 1:
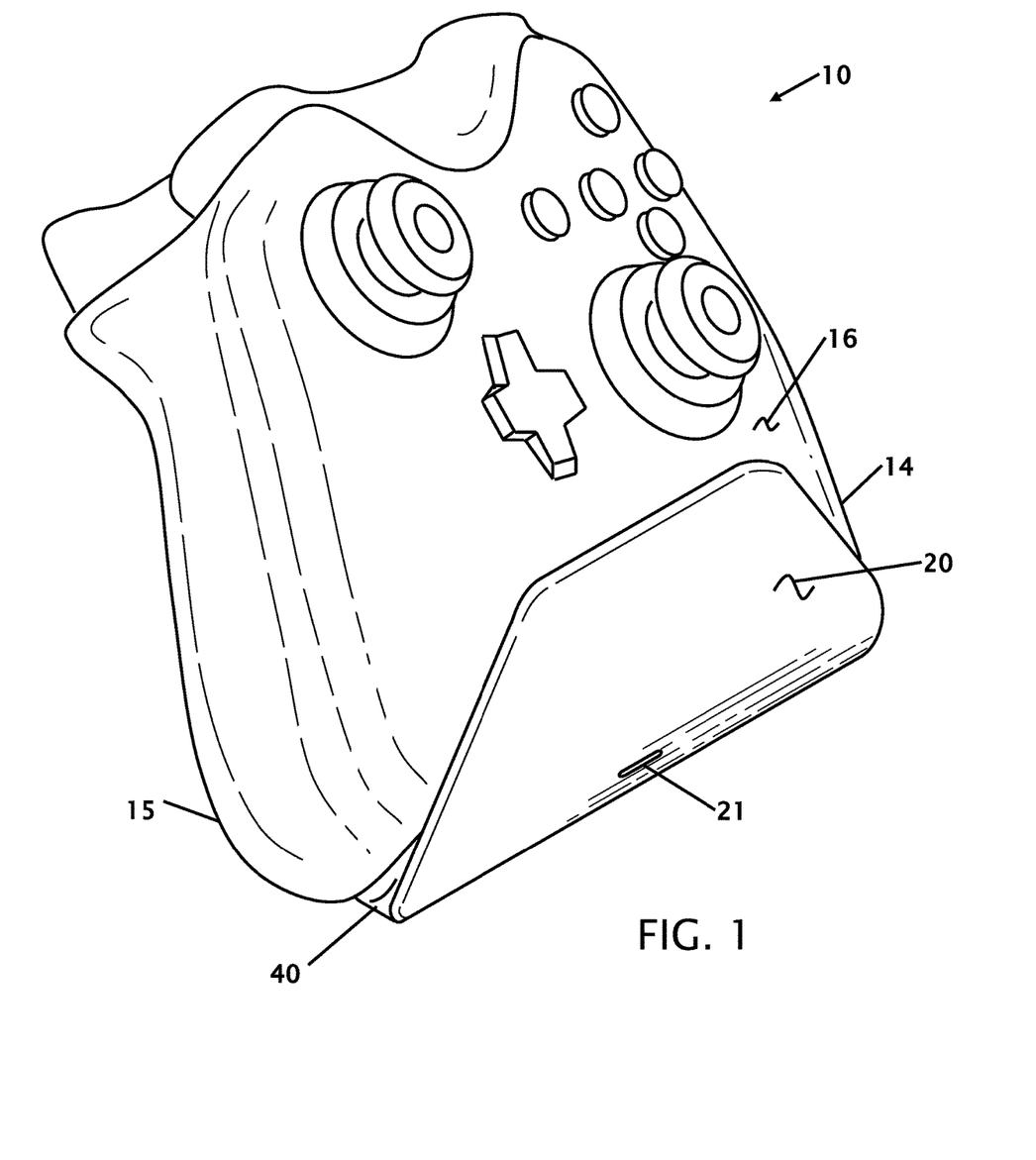
FIG. 1 shows a perspective view of the remote control stand with a game controller retained within the remote control stand.

ITEM NUMBERS AND DESCRIPTION 10 remote control stand
14 hand grip
15 hand grip
16 game controller
20 face plate
21 charge indicator
22 hook
23 flex arm
24 indicator opening
25 centering boss
30 lens
31 lens top
40 base housing
41 power socket
42 cooling holes
43 charging contacts
44 tab
45 connector
46 front face
47 round centering opening
48 rectangular opening
49 connector plate
50 connector PCB
51 stud(s)
52 lens opening
58 saddle
59 grip saddles
60 PCB
70 rear housing
80 power storage
81 storage housing FIG. 1 shows a perspective view of the remote control stand 10 with a game controller 16 retained within the remote control stand 10. While this figure may show a particular wireless game controller, the game controller 16 can take a different visual appearance and the retainer or stand is configured to accommodate the particular geometry of the wired or wireless controller 16. In this preferred embodiment the remote control stand 10 has a removable/replaceable face plate 20 on the base housing 40. The face plate 20 has a charge indicator 21. The charge indicator 21 can show different colors and/or can flash to show the charging status of the remote and/or the remote control stand 10.

The game controller has two separate hand grips 14 and 15 and the stand supports the game controller 16 by retaining the game controller 16 between the two separate hand grips 14 and 15. When the game controller 16 is placed into the remote control stand 10 the stand provides an enlarged grip area for the game controller 16 that allows a user to safely hold the game controller 16 without fear of activating the buttons and controls as the person lifts the holder and game controller and sets the holder and game controller down as a single unit. The stand does not restrict use of the functions of the game controller. A user can use the game controller while the game controller is installed on the stand while the stand is sitting on a table, desk or other surface. Game controllers 16 generally have curved surfaces to conform to the hand or hands of a user. Because the surfaces are curved, activation of a button while the game controller is sitting on a curved housing will cause the controller to rock on the curved surface and thereby making the controller unstable.

Figures 2, 3:
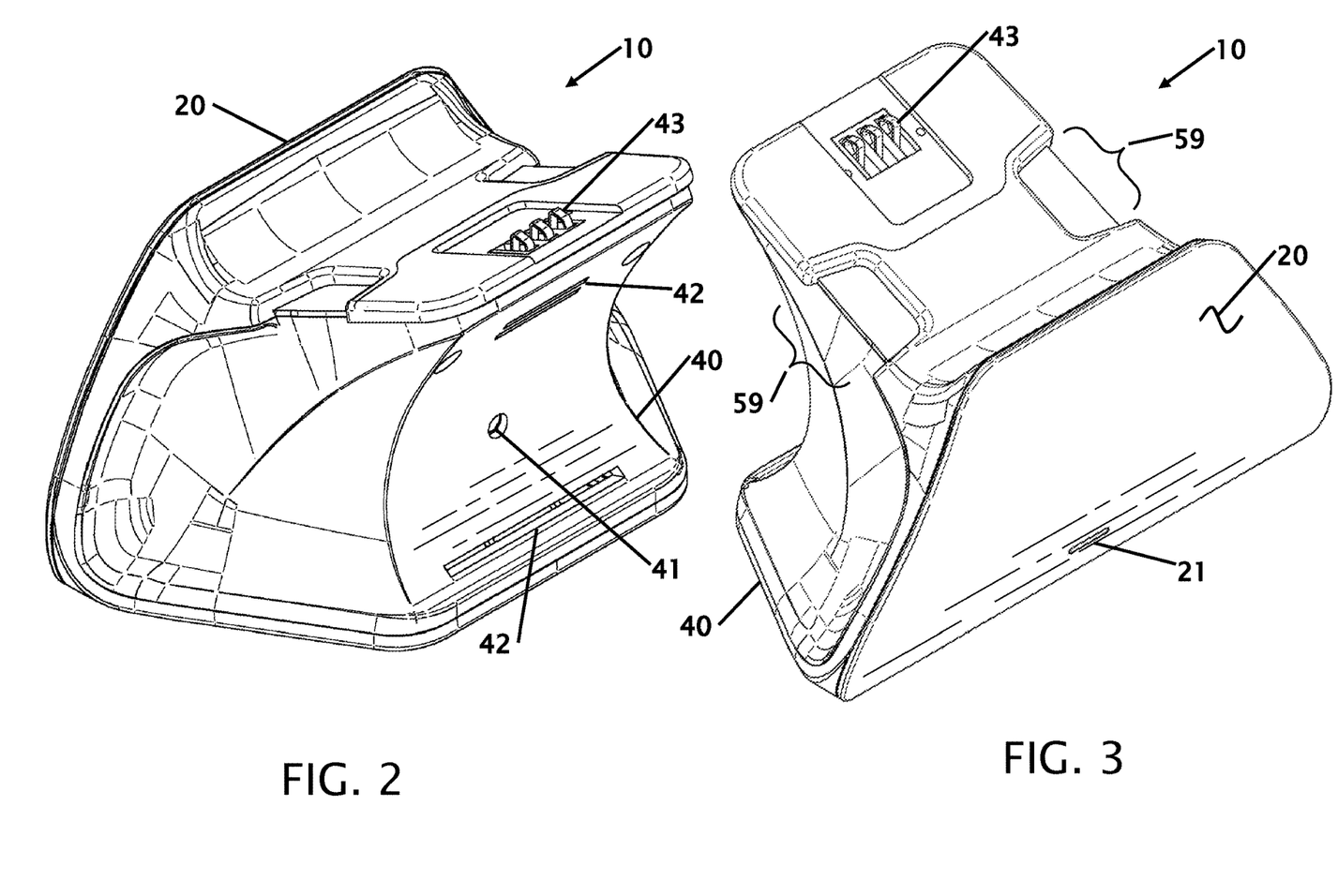
FIG. 2 shows a rear perspective view of the remote control stand.
FIG. 3 shows a front perspective view of the remote control stand.

FIG. 2 shows a rear perspective view of the remote control stand 10 and FIG. 3 shows a front perspective view of the remote control stand 10. These views show the remote control stand 10 with the faceplate 20 installed. The face plate 20 can be custom printed and/or embossed to reflect a particular game or gaming system. Due to the variety of games and gaming systems along with the continuous release of new games the face plate 20 can be customized and installed onto the remote control stand 10 prior to shipment. It allows the manufacturer the ability to stock the base stand and either a variety of different face plates 20 or to print the faceplate just prior to placing the remote control stand 10 into a box for shipment. The face plate 20 "snaps" or is otherwise secured to the base housing 40. The connection mechanism is shown and further described in other figures herein.

When a remote control (not shown in these figures) is installed on the remote control stand 10 the handles straddle the grip saddles 59 on opposing sides of the remote control stand 10. With the remote control installed the remote control has electrical contacts that contact the charging contacts 43. These charging contacts 43 will recharge batteries within the remote control and can also provide power to the remote control while the remote control is properly installed on the remote control stand 10. Electrical power is supplied to the remote control stand 10 through a power socket 41 that is locate on the back of the remote control stand 10. The remote control stand 10 also has some internal power supply that allows the remote control stand 10 to power a remote control with or without external power being supplied to the remote control stand 10.

When power is supplied to the remote control stand 10 a charge indicator 21 is illuminated. The charge indicator 21 can have a variety of colors and/or can flash to indicate the charging status of the remote control stand 10 and/or the remote control. The base housing 40 is shown with a plurality of cooling holes 42 or openings that allows for cooling or heat build-up of internal electronics.

Figure 4:
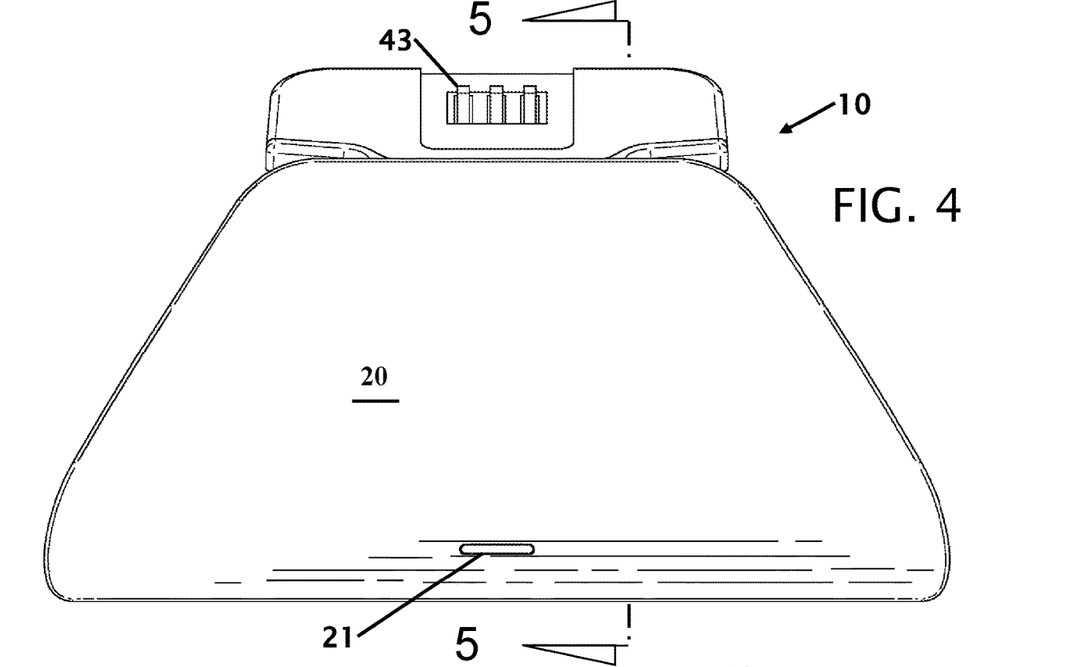
FIG. 4 shows a front plan view of the remote control stand.
Figure 5:
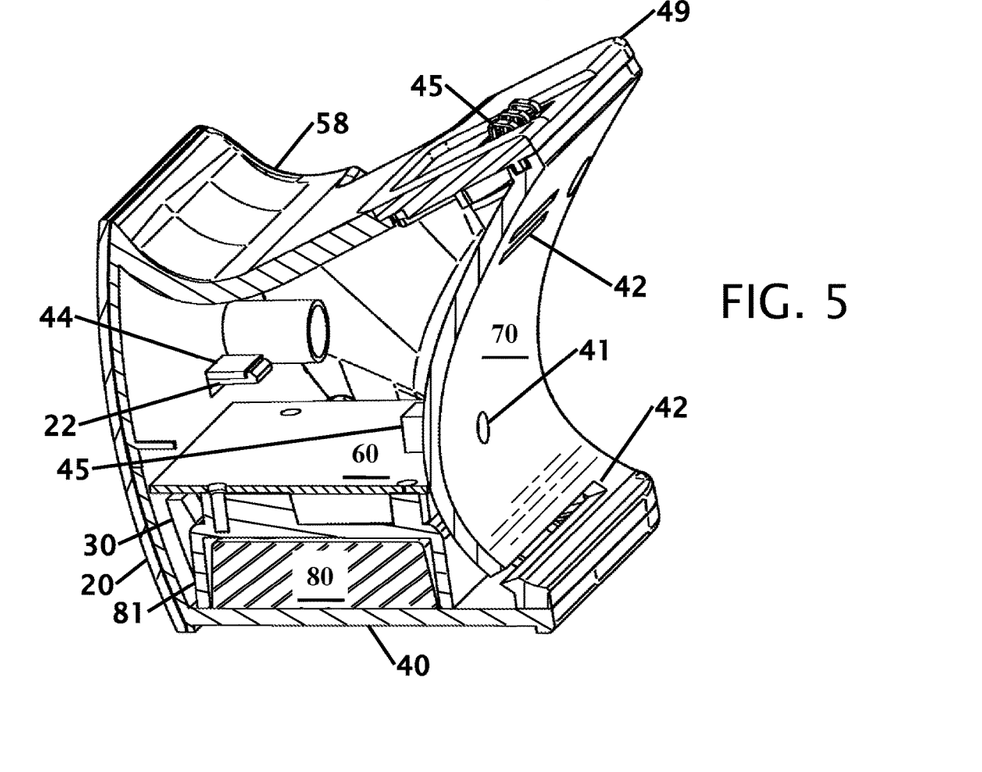
FIG. 5 shows a side sectional view of the remote control stand cut through section 5-5 from FIG. 4.

FIG. 4 shows a front plan view of the remote control stand 10 and FIG. 5 shows a side sectional view of the remote control stand 10 cut through section 5-5 from FIG. 4. The cross-sectional view shows the internal structure and the securing mechanisms that hold the face plate 20 onto the front of the base housing 40. In general, the face plate 20 is retained on the base housing 40 with a plurality of hooks 22 that engage on tabs 44. While this figure shows a single hook 22 and tab 44, other figures shows the plurality of these components to secure the face plate 20.

In these figures the charging contacts 43 are shown of the upper rear of the remote control stand 10. These charging contacts connect to a remote control (not shown in this figure) to charge and power the remote control. When the remote control is properly seated on the remote control stand 10 the remote control will sit on the saddle 58 and rest against the contacts 45. The charging indicator 21 is an extension of the lens 30 and extends through the face plate 20 to provide a visible indicator of charging and/or a charge status of the remote control and/or the internal power storage 80 in the bottom of the remote control stand 10.

The internal power storage 80 is a power pack or batteries and is retained in a storage housing 81 that is mounted or otherwise secured to the base housing 40. A PCB 60 is secured to the storage housing 81. The PCB 60 has the connector 45 for receiving external power through the power socket 41 through a rear housing 70. The connector 45 is on a connector plate 49 and can be changed or altered for different connector 45 locations or types. The PCB 60 conditions power from the external power, connects to the connector 45, handles power to and from the power storage 80 and provides illumination to the charge indicator 21. Cooling holes 42 in the rear housing 70 allow for some air movement through the remote control stand 10 to vent heat that may be created in the remote control stand 10 by the PCB and/or the power storage 80.

Figure 6:
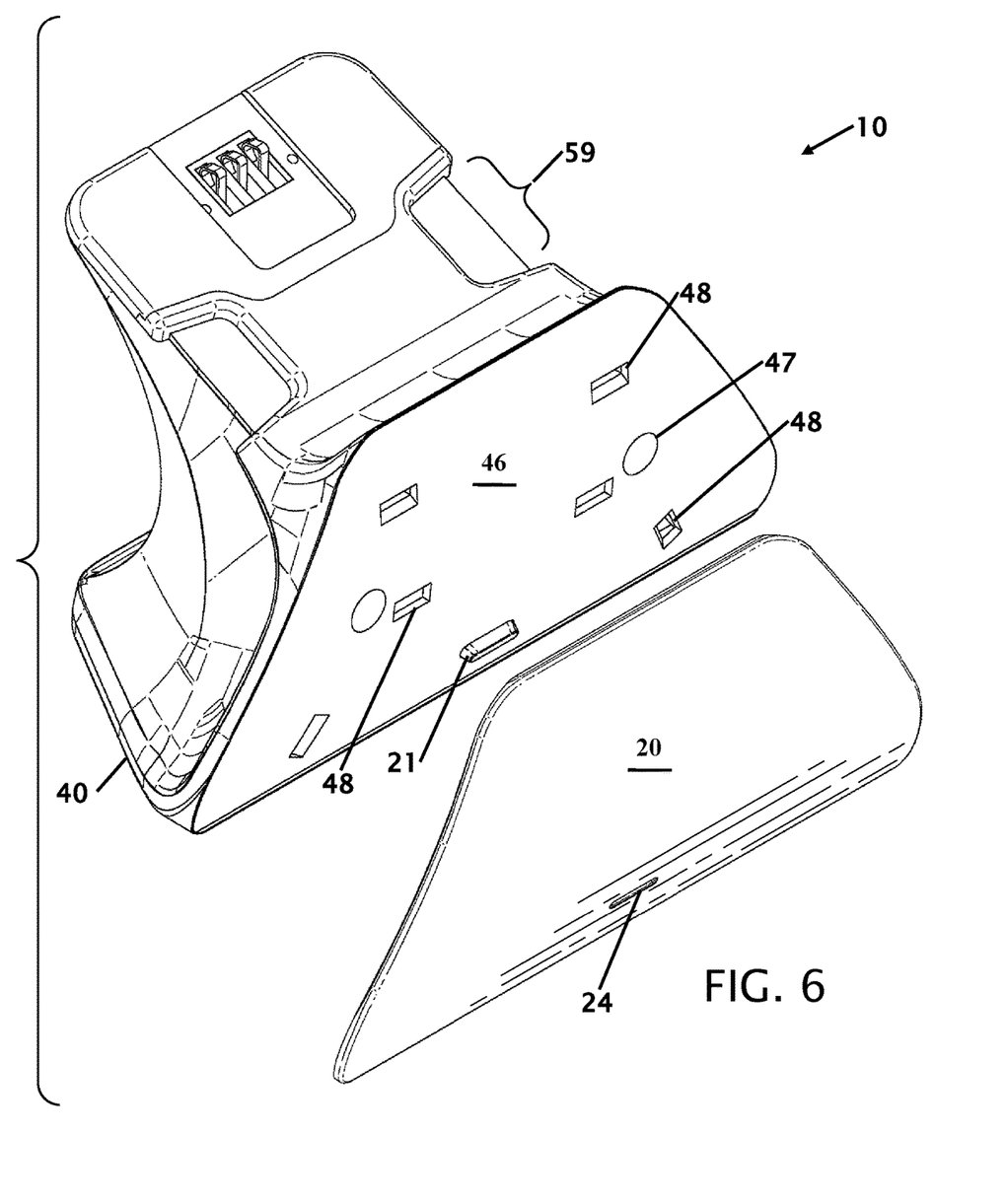
FIG. 6 shows a front perspective view of the remote control stand with the face plate displaced.

FIG. 6 shows a front perspective view of the remote control stand 10 with the face plate 20 displaced. From this view the grip saddle(s) 59 are clearly shown on the sides of the base housing 40. This figure shows the charging indicator 21 proudly extending out from a front face 46 of the base housing 40. The charge indicator 21 extends into and through an indicator opening 24 where the front of the charge indicator 21 is essentially flush with the outer face of the face plate 20. The front face 46 has a plurality of round centering openings 47 and a plurality of rectangular openings. In other figures the complementary features on the rear of the face plate 20 are shown and described to engage and secure the face plate 20 onto the based housing 40. The round centering openings 47 ensure proper alignment of the hooks 22 on the tabs 44.

Figure 7:
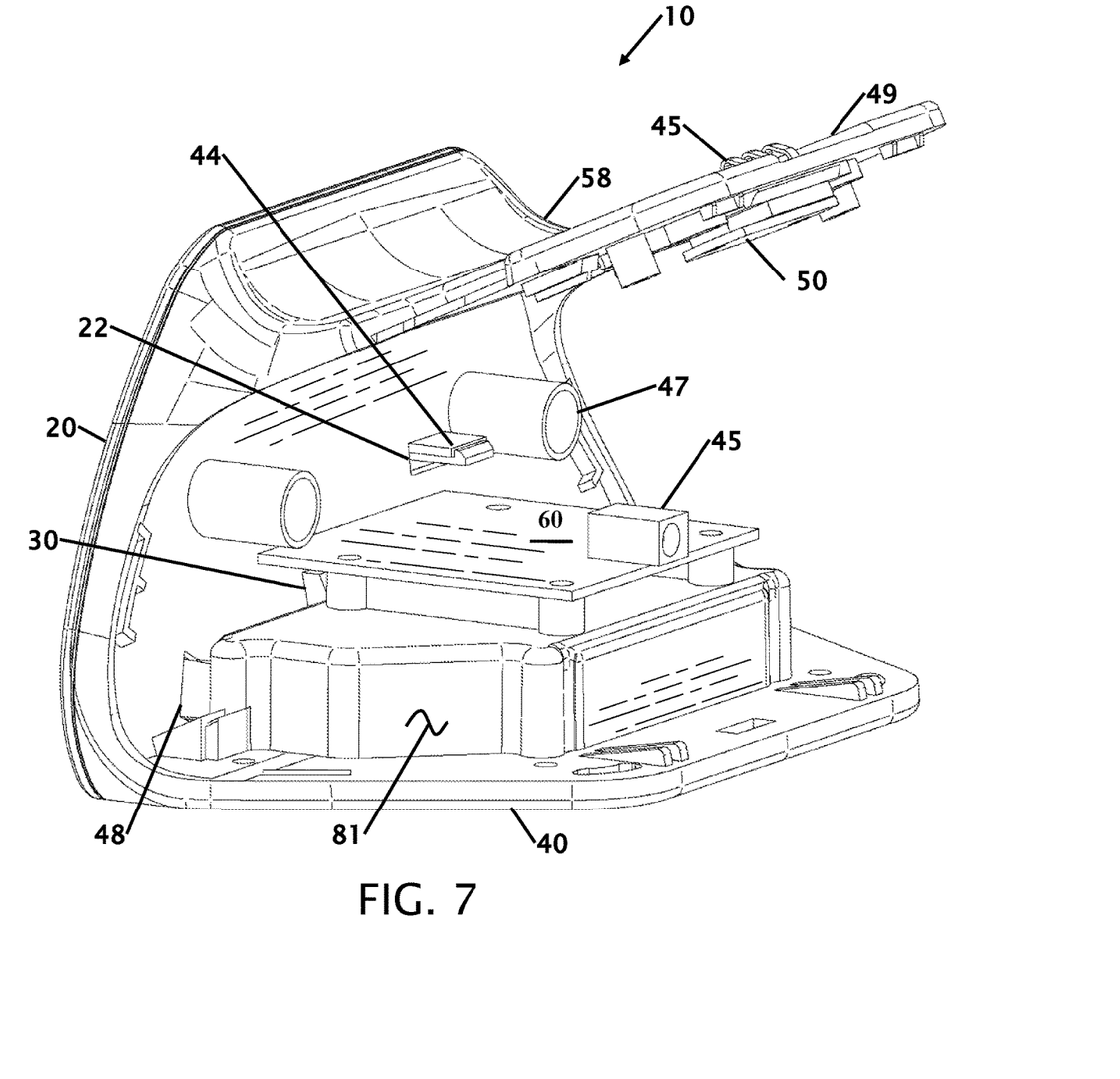
FIG. 7 shows a rear perspective view of the remote control stand with the rear housing removed.

FIG. 7 shows a rear perspective view of the remote control stand 10 with the rear housing removed. This figure shows the internal structure and the securing mechanisms that hold the face plate 20 onto the front of the base housing 40. In general, the face plate 20 is retained on the base housing 40 with a plurality of hooks 22 that engage on tabs 44. The hook(s) 22 pass through rectangular opening(s) 48. While this figure shows a single hook 22 and tab 44, other figures shows the plurality of these components to secure the face plate 20. Some of the hooks and tabs are obscured by the saddle 58 of the base housing 40, round centering opening 47 and the storage housing 81.

In these figures the charging contacts 43 are shown of the upper rear of the remote control stand 10. These charging contacts 43 connect to a remote control (not shown in this figure) to charge and power the remote control. The lens 30 extends through base housing 40 and the face plate 20 to provide a visible indicator of charging and/or a charge status of the remote control and/or the internal power storage in the storage housing 81 in the bottom of the remote control stand 10.

The PCB 60 is secured to the storage housing 81. The PCB 60 has the connector 45 for receiving external power through the power socket 41 through a rear housing 70. The connector 45 is on a connector plate 49 and can be changed or altered for different connector 45 locations or types. A connector PCB 50 connects to the main PCB 60 and to the connector(s) 45. The main PCB 60 conditions power from the external power, connects to the connector 45, handles power to and from the power storage 80 and provides illumination to the charge indicator 21.

Figure 8:
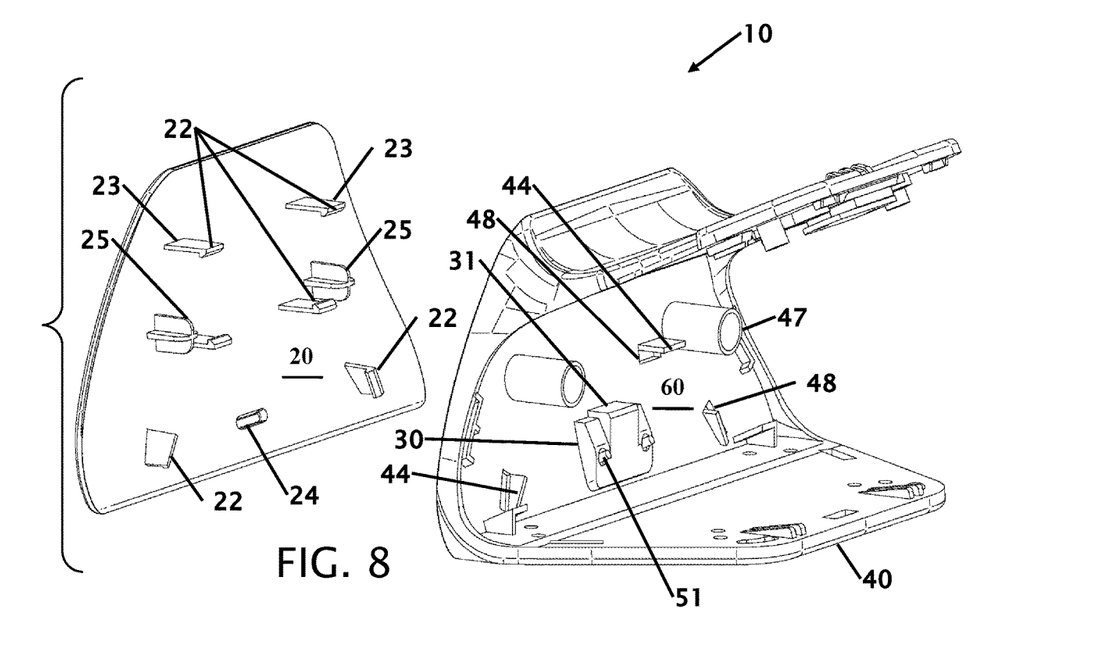
FIG. 8 shows a rear perspective view of the remote control stand with the face plate displaced and the indicator light lens.
Figure 9:
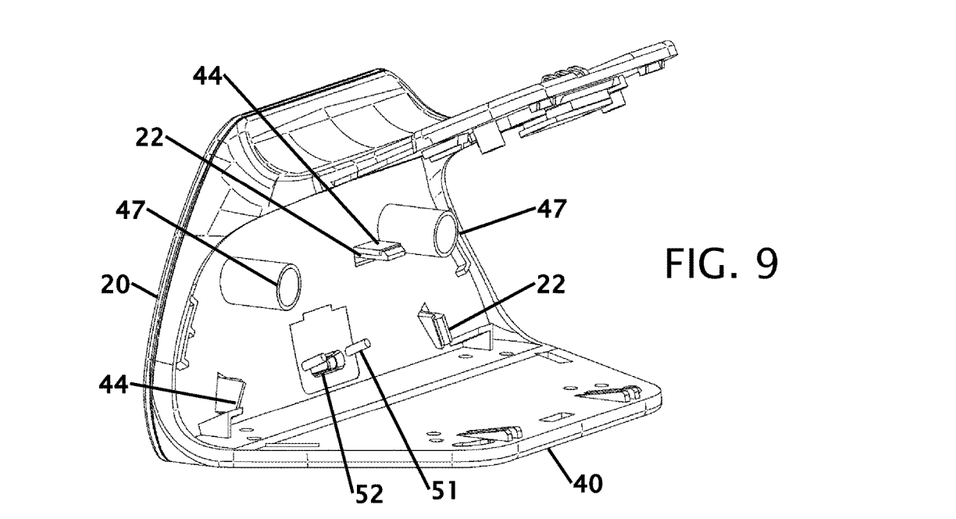
FIG. 9 shows a rear perspective view of the remote control stand with the face plate installed on the base housing.

FIG. 8 shows a rear perspective view of the remote control stand 10 with the face plate 20 displaced and the indicator light lens 30 and FIG. 9 shows a rear perspective view of the remote control stand 10 with the face plate 20 installed on the base housing 40. Starting with the face plate 20, the indicator opening 24 is shown as an open oval. The rear of the face plate 20 has a plurality of centering boss 25 cruciforms that locate the face plate 20 with the centering bosses 25 passing into the centering round openings 47. The rear of the face plate 20 further shows a plurality flex arms 23 with hooks 22. The flexible flex arms 23 and hooks 22 pass through rectangular openings 48 in the base housing 40. The flexible arm bends to snap around the tabs 44. The flex arm(s) 23 can be bent to remove the faceplate 20 from the base housing 40. The hooks 22 are configured to "hook" "snap" or otherwise engage onto the tabs 44. There are a total of six hooks 22 and tabs 44, but there could be as few as one, two, 4, 6 or more. In the figures you can see that some of the hooks 22 are arranged in a mirror image to lock the tabs 44 in opposite directions.

The lens 30 passes through the lens opening 52 in the base housing 40 and then through the indicator opening 24 in the face plate 20. While an oval indicator opening 24 is shown and described, other shapes are contemplated including illuminating all or a portion of the face plate. An LED or other illumination device sends illumination into the lens top 31 to illuminate the lens 30 and the illumination is visible on the charger indicator. A plurality of studs 51 that are adjacent to the lens opening 52 are for securing the lens 30 to the base housing 40 and are heat staked or otherwise deformed to retain the lens 30 onto the inside of the base housing 40.

Thus, specific embodiments of a holder for a game controller have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A remote control stand for a game controller comprising:
   a support structure having at least one pocket that supports at least one game controller;
   said support structure includes a connection that provides electrical power and/or charging to said at least one game controller;
   said support structure includes a base housing and a separate face plate;
   said separate face plate being configured to be secured to said base housing with a securing mechanism;
   said base further includes a charge indicator having a lens that extends from within said base housing through said base housing and said separate face plate;
   said securing mechanism includes at least one hook and at least one tab, and
   said base housing includes at least one connector that receives electrical power from an external power source.

2. The remote control stand for a game controller according to claim 1, wherein said separate face plate includes indicia.

3. The remote control stand for a game controller according to claim 1, wherein said support structure does not restrict use of controls on said at least one game controller when said at least one game controller is seated in said support structure.

4. The remote control stand for a game controller according to claim 1, wherein said support structure supports said game controller by retaining said game controller between two separated hand grips.

5. The remote control stand for a game controller according to claim 1, further includes an internal chargeable power source.

6. The remote control stand for a game controller according to claim 5, wherein said internal chargeable power source is configured to power and or charge said at least one game controller.

7. The remote control stand for a game controller according to claim 1, wherein said charge indicator has more than one color and/or flashes.

8. The remote control stand for a game controller according to claim 1, wherein said base housing has at least two centering openings.

9. The remote control stand for a game controller according to claim 8, wherein said separate face plate has at least to centering bosses that are configured to mate with said at least two centering openings in said base housing.

10. The remote control stand for a game controller according to claim 1, wherein said base housing has at least two openings that are configured to receive said securing mechanisms from said separate face plate.

11. The remote control stand for a game controller according to claim 1, wherein said separate face plate has at least one flexible arm with said at least one hook that is configured to secure said separate face plate on said base housing.

12. The remote control stand for a game controller according to claim 11, wherein there are at least two flexible arms, with each flexible arm having a hook.

13. The remote control stand for a game controller according to claim 11, wherein there are at least 4 flexible arms, with each flexible arm having a hook.

14. The remote control stand for a game controller according to claim 11, wherein there are 6 flexible arms, with each flexible arm having a hook.

15. The remote control stand for a game controller according to claim 1, wherein said base housing further includes a power storage device.

16. The remote control stand for a game controller according to claim 15, wherein said power storage device is connected to said connection that provides electrical power and/or charging to said at least one game controller.

17. The remote control stand for a game controller according to claim 1, further includes a rear housing with cooling openings.

* * * * *